United States Patent [19]

Vollmer

[11] Patent Number: 5,314,206
[45] Date of Patent: May 24, 1994

[54] SLIDING SEAT SAFETY DEVICE IN A VEHICLE

[75] Inventor: Elmar Vollmer, Wettstetten, Fed. Rep. of Germany

[73] Assignee: Audi AG, Ingolstadt, Fed. Rep. of Germany

[21] Appl. No.: 25,171

[22] Filed: Mar. 1, 1993

Related U.S. Application Data

[63] Continuation-in-part of PCT/EP91/01356, Jun. 19, 1991.

[30] Foreign Application Priority Data

Oct. 12, 1990 [DE] Fed. Rep. of Germany ....... 4032386

[51] Int. Cl.$^5$ ............. B60R 21/02; B60R 22/02; B60N 2/42; B60N 2/08
[52] U.S. Cl. ................. 280/801.1; 180/268; 297/216.18; 297/473; 296/68.1
[58] Field of Search ............ 180/268; 280/801.1; 296/65.1, 68.1; 297/216.1, 216.18, 468, 473; 248/429, 430

[56] References Cited

U.S. PATENT DOCUMENTS

| | | | |
|---|---|---|---|
| 3,788,685 | 1/1974 | Leichtl | 296/68.1 |
| 4,262,963 | 4/1981 | Bauer | 248/429 |
| 4,552,381 | 11/1985 | Schlanger | 280/752 |
| 4,623,192 | 11/1986 | Koide et al. | 297/216 |
| 4,804,229 | 2/1989 | Nishino | 248/430 |

FOREIGN PATENT DOCUMENTS

| | | | |
|---|---|---|---|
| 0357225 | 3/1990 | European Pat. Off. | B60R 21/22 |
| 3837170 | 5/1990 | Fed. Rep. of Germany | 296/68.1 |
| 4002448 | 8/1990 | Fed. Rep. of Germany | B60R 21/045 |
| 0094274 | 7/1969 | France . | |
| 63-13846 | 1/1988 | Japan | 180/268 |

OTHER PUBLICATIONS

Henseler, Das Daimler-Benz Beifaher-Airbag-System, ATZ Automobiltechnische Zeitschrift Apr. 1989, No. 4, pp. 205-210.

Primary Examiner—Karin L. Tyson
Attorney, Agent, or Firm—Jacques M. Dulin; Tom C. Feix

[57] ABSTRACT

A seat adjustment latch, selectable at two different force levels, is attached to a slide adjustable seat in a motor vehicle equipped with a seat belt assembly, an inflatable air bag, and a knee restraint. The seat adjustment latch is interlocked with the seat belt assembly of the seat such that when the seat belt is unfastened, the seat adjustment latch is set to release the vehicle seat in the event of a rapid deceleration or impact to the vehicle above a predetermined level of severity. When the seat belt is fastened, the seat latch is set in its firmest possible retention setting and operates such that the inertia and kinetic energy forces of the seat and the occupant seated thereon will not move the seat forward in response to a severe frontal collision. In a preferred embodiment, the seat adjustment latch includes a shearing element configured as a tubular bolt for retaining the slide adjustable vehicle seat to the seat rails. The tubular bolt is selectively reinforced at a shear region by a moveable insert piece, the movement of which is influenced mechanically by the fastened/unfastened condition of the seat belt. In an alternate embodiment, the movement of the insert piece is controlled electrically.

8 Claims, 2 Drawing Sheets

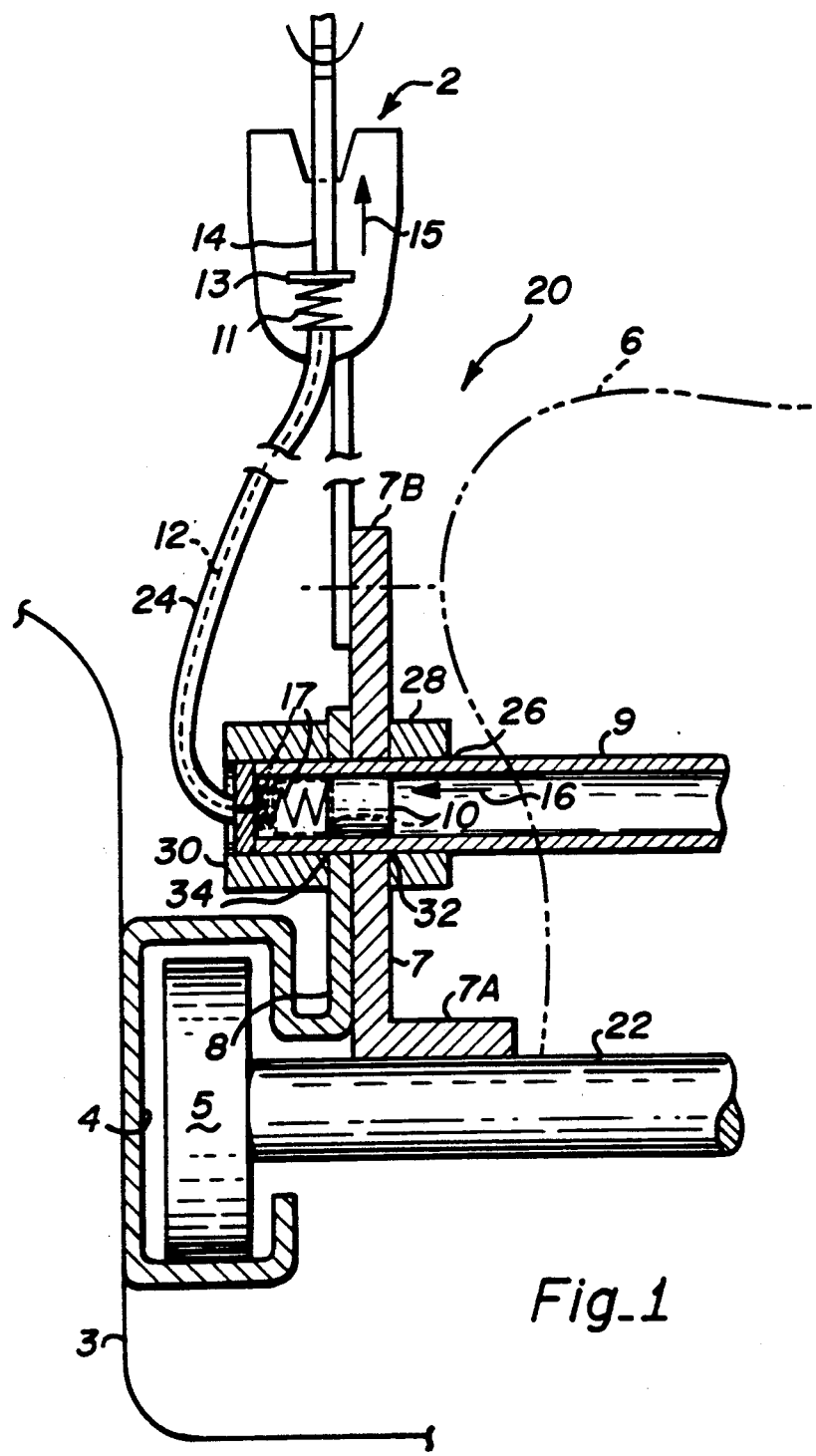
Fig_1

TO SEAT BELT LOCK
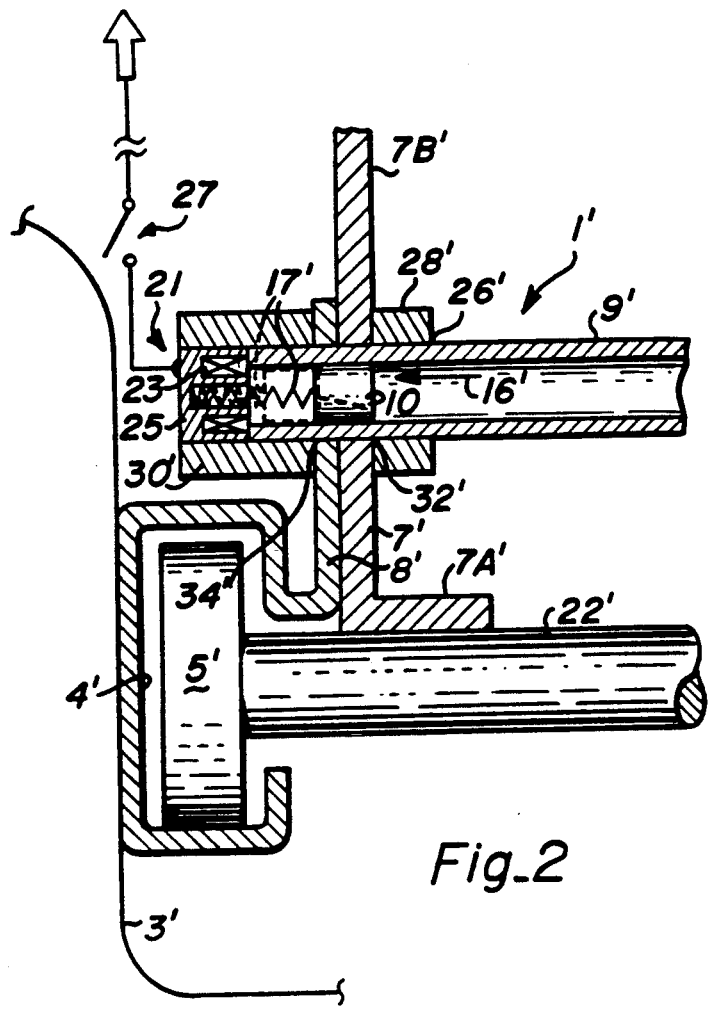
Fig_2
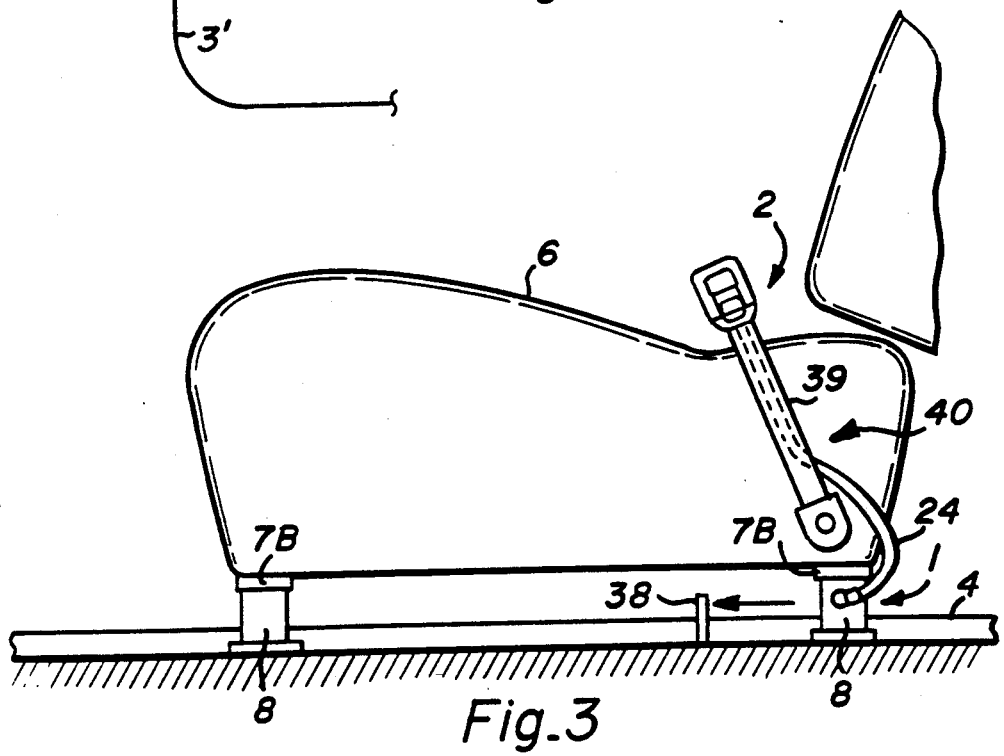
Fig_3

SLIDING SEAT SAFETY DEVICE IN A VEHICLE

CROSS REFERENCE TO RELATED APPLICATIONS:

This is a continuation-in-part application of copending international application number PCT/EP91/01356, filed Jul. 19, 1991 and claiming priority of German patent application number P 40 32 386.2, filed Oct. 12, 1990.

FIELD

The invention relates to passive safety systems for motor vehicles of the type which include an air bag and/or a knee restraint. More particularly, the invention relates to an apparatus which facilitates "breakaway" or forward motion of a passenger-occupied vehicle seat during a frontal collision to properly position the passenger for more effective engagement with the air bag and/or knee restraint when the passenger's seat belt is not fastened.

BACKGROUND

There are many safety devices which may be installed in motor vehicles for protection of the occupant(s) (i.e., the driver and/or passenger) during a collision. Passive safety systems, for example, perform their protective function without active manipulation by the occupant(s). Known passive safety systems typically include a driver's side air bag and optionally a passenger side air bag as a first passive safety system component. The air bag(s), being triggered by one or more acceleration sensors, is (are) inflated rapidly during a severe collision in order to cushion the frontal impact of the driver's and or passenger's upper torso and head against the steering wheel and/or dashboard. Known passive safety systems may also include a knee restraint protective device as a second component which is typically disposed beneath the dashboard. Like the airbag(s), the knee restraint is also rapidly inflated upon detection of a severe frontal impact for cushioning the knees and upper legs of the occupant(s).

While such passive system devices are effective in protecting most occupants from impacting the steering wheel and/or dashboard during a severe frontal collision to the vehicle, the effectiveness of the known passive safety system is reduced in the case of the "small" occupant. An example of a "small" occupant is a mature female having a physical stature which places her in the lowest five percent of the population (i.e., the so called "five percent woman"). During a severe frontal collision, a "small" occupant without a fastened seat belt will tend to slide from her seat and under the knee restraint device and thereby impact against the dashboard or steering column and suffer severe physical injury.

This sliding condition is made worse if the occupant's seat is set in the furthest rearward position (i.e., in a direction away from the dashboard) when the collision occurs. This situation typically occurs on the passenger side since it is often desirable to move the seat as far back as possible to provide a maximum amount of leg room. In such a situation, however, even normal sized and larger occupants are likely to slide off the seat and impact the dashboard before impacting the knee restraint or air bag protective device.

A possible solution to this problem could be achieved by simply restricting the rearward range of travel of the seat. However, this would unnecessarily restrict the comfort for all sizes of occupants.

Another solution would be to control the inflation process for the knee restraint device by taking into account the rearward position of the seat and the body size of the occupant. Such an approach is known, for example, from published European patent document EP-A0 357 225 wherein a passive safety system is disclosed for optimally controlling the inflation process of an air bag by taking into account: (1) the relative rearward position of a vehicle seat; (2) the body size of an occupant; and (3) the unfastened condition of the occupant's safety belt. A drawback with such an air bag inflation control system is that it requires expensive sensors to detect or monitor these conditions, as well as complicated actuators to perform the air bag inflation process. Also, a similar system for controlling the inflation process of a knee restraint device would likely be complex and costly.

For vehicles equipped with a passive safety system which includes both an air bag and knee restraint as previously described above, it is customary, and in some countries mandatory, to also provide safety belts as additional restraint systems. When the safety belts are worn, the above described risks are substantially reduced. However, it is well known that not all passengers will wear the safety belts all the time.

Accordingly, there is a definite need in the art for a simple and inexpensive motor vehicle safety device which releases a passenger occupied vehicle seat for forward movement in the event of a frontal collusion when the seat belt is not used for more effective engagement with an air bag and/or knee restraint device.

THE INVENTION

Objects

It is among the objects of the invention to provide an improved passive safety system for occupants of a motor vehicle wherein an occupied vehicle seat is permitted to "breakaway" or slide forward upon a frontal impact above a predetermined level of severity in order to position the seat for more effective safety operation of a provided air bag and/or knee restraint protective device.

It is another object of the invention to provide an improved passive safety system of the type described wherein the breakaway action of the seat is regulated by the fastened/unfastened condition of the seat belt.

It is still another object of the invention to provide an improved passive safety system of the type described which is simple and inexpensive to implement in existing passive safety systems.

These and other objects of the present invention will no doubt become apparent to those skilled in the art from the following detailed description of the preferred embodiment illustrated in the drawing and further in view of the appended claims.

DRAWINGS

The invention is illustrated in more detail by reference to drawings in which:

FIG. 1 is a frontal cross-sectional schematic view of the improved safety device illustrating a mechanically actuated seat latch 1.

FIG. 2 is an enlarged frontal cross-sectional view similar to FIG. 1 but showing an electromagnetically actuated seat latch 1' constructed in accordance with an alternate embodiment of the present invention.

FIG. 3 is a schematic side elevation view of a vehicle seat illustrating the braking means for limiting the slide adjustment of the seat.

SUMMARY

The objects of the invention are achieved in part through the provision of a seat adjustment latch to the seat belt closure mechanism of a slide adjustable vehicle seat, wherein the latch is selectable between two different force levels for breakaway operation of the seat in dependence upon the fastened and unfastened condition of the seat belt. The latch is preferably attached to the slide adjustable seat in a motor vehicle equipped with a seat belt assembly, an inflatable air bag, and a knee restraint.

In the preferred embodiment, the seat adjustment latch is interlocked with the seat belt assembly of the seat such that when the seat belt is fastened, the seat adjustment latch is set to release at a first force level and when the seat belt is unfastened, the seat adjustment latch is set to release at a second lower force level. In other words, when the seat belt is fastened, the seat latch is set to its firmest possible retention setting such that the seat operates in a familiar manner, and the inertia and kinetic energy forces of the seat and occupant seated thereon will not move the seat forward (or rearward) in response to a severe frontal collision. However, if the seat belt is not fastened, the latch is set to release at the second lower force level, thus permitting the seat to move forward or "break-away" in response to a severe frontal collision.

In the present invention, a severe frontal collision occurs when the acceleration acting on the seat exceeds a certain predetermined threshold. When the predetermined threshold is exceeded and the seat belt is unfastened, the seat will slide forward at approximately the same time and rate as the occupant seated thereon. In this manner, injury is avoided since the occupant is prevented from sliding off the seat and under the inflated air bag and/or knee restraint protective device. The breakaway action of the seat latch ensures that a smaller sized occupant remains on the seat during a collision and is carried by the seat for effective engagement with the rapidly inflated air bag and/or knee restraint thereby minimizing injury. It should be noted that larger-sized passengers with the seat set in a forward position are not likely to slide beneath the air bag but are likely to move into it. The above safety benefits are achieved, however, for larger-sized occupants who have their seat adjusted in the furthest back position.

The second force level is established at a sufficiently high level such that no seat movement or break-away action will occur during a normal driving incident. For example, the seat will not "break away" if the vehicle is bumped or hit during a typical low speed parking lot accident. It is found that a level of around five G's is a desirable setting for the second force level. An unoccupied seat can be designed to resist accelerations up to around 20 G's to avoid unwanted seat movement during an accident.

In the preferred embodiment, the seat adjustment latch includes a hollow breaking element in the form of a tubular bolt for securing the seat support to the seat rails and having a wall thickness and material strength designed to shear or break when acted upon by a force exceeding a predetermined force threshold thus permitting the seat to move. A mechanical connection, preferably acting through a cable, is made between the lock of the seat belt assembly and the seat adjustment latch. When the seat belt assembly is fastened, a tongue of the lock moves the cable such that the seat adjustment latch is set to the first force level. When the seat belt assembly is not fastened, the tongue of the lock moves the cable such that the seat adjustment latch is set to the second force level. The breaking element is placed in an active position when the seat adjustment latch is set to the second force level (i.e., where the seat belt is unfastened) and is placed in an inactive position when the seat adjustment latch is set to the first force level (i.e., where the seat belt is fastened).

The breaking element of the latch includes a transverse tube or tubular bolt which is received within a pair of coaligned holes, including a first hole provided in a longitudinally oriented seat rail mounted to the vehicle floorboard, and a second hole provided in an abutting seat holder fixed to the underside of the seat. The tubular bolt is adapted to shear at the predetermined force threshold allowing the seat holder (and seat) to move forward or "break-away" from the floor mounted seat rail. In other words, the shear action of the tubular bolt prevents a "submarining" condition from occurring, i.e. where the seated occupant slides off the front of a non-moving seat and under the dashboard. The seat holder secured to the underside of the seat is mechanically linked, preferably via a roller assembly, to the seat rail to permit forward or rearward longitudinal sliding movement of the seat in accordance with the known way.

An internal plug-like sliding reinforcement piece, connected to the lock of the seat belt assembly via the cable, is disposed within the tubular bolt and is biased by a spring to move back and forth within the tubular bolt in dependence upon the fastened and unfastened condition of the seat belt. When the seat belt is fastened, the sliding piece is moved to reinforce the tubular bolt at the area of abutment between the seat rail and the seat holder. This places the latch into an inactive position (corresponding to a first force level setting) such that the tubular bolt will not shear and will not release the seat. When the seat belt is unfastened (corresponding to the second force level setting), the sliding piece is moved out of its reinforcement position within the tubular bolt, and the latch is placed in the active position, so that the now unreinforced tubular bolt will shear or break through the wall thickness of the tubular bolt during a frontal collision in excess of five G's and thereby permit the seat to release and slide forward. When the seat belt is refastened, the biasing spring moves the sliding piece back into the reinforcement position within the tubular bolt.

It will be appreciated that, in lieu of the selectively reinforced hollow breaking element, other designs or techniques may be used. For example, a catching device may be used to hold the seat holder to the seat rail. Under certain conditions the device is overloaded and releases the seat.

In an alternate embodiment, the seat adjustment latch is implemented in a seat which is adjustable via electric means. In this embodiment, the setting of the seat adjustment latch at either the first or second force levels is accomplished electrically through an actuated locking magnet. The actual state of a seat belt (i.e., whether the seat belt is fastened or unfastened) is fed back to the seat adjustment latch via an actuating signal generated by a contact switch.

In another alternate embodiment the seat adjustment latch is activated only when the seat is placed in the furthest back position. Since the particular problem of a smaller occupant or a normal or even larger sized occupant sliding off the seat before contacting a knee restraint occurs only when the seat is placed in the furthest rearward position, it is sufficient to provide a seat release under heavy loads only when the seat is so positioned. If the seat is placed in a more forward position, the seat release may be disabled or any sliding movement of the seat may be limited by using a suitably cushioned stop. Thus, in this manner, the occupant sitting on the seat is not subjected to unnecessary forces which arise as a result of an unnecessary release and acceleration of the seat.

DETAILED DESCRIPTION OF THE BEST MODE

The following detailed description illustrates the invention by way of example only, and not by way of limitation of the principles of the invention. This description will clearly enable one skilled in the art to make and use the invention, and describes several embodiments, adaptations, variations, alternates, and uses of the invention, including what I presently believe is the best mode of carrying out the invention.

FIG. 1 illustrates, in schematic cross-section, a seat adjustment latch 1 and a seat belt lock 2 both of which are parts of a safety system 20 installed in a motor vehicle. The safety system 20 preferably also includes an inflatable air bag (not shown) and knee restraint (not shown), both of which may be installed in the dashboard region of the motor vehicle in accordance with the known way.

A seat rail 4 is attached to a flooring member 3 of the vehicle body and is oriented generally parallel to the longitudinal axis of the vehicle. The rail 4 is generally C-shaped in cross-section, and includes an elongated upright piece 8 which extends vertically upward from the upper inward facing portion of the C-section rail 4. As illustrated, a transverse through-hole 34 is formed through the piece 8. A second seat rail (not shown) is provided in a similar fashion for supporting the other side of the seat. The second seat rail may also include the tubular bolt shearing or breaking element for facilitating selective break-away operation of the seat, as will be described more fully below.

The seat (only a partial view of a seat cushion 6 is shown) is supported by a roller mounted support shaft 22. A roller 5 is disposed at each end of the shaft 22 (only one end of the shaft is shown), and facilitates the seat's fore/aft sliding movement in the longitudinal direction along the rail 4. A vertically upright flanged seat holder 7, defined as a generally L-shaped member in cross-section, includes a base portion 7A attached to the shaft 22, and an elongated upstanding vertical portion 7B which abuts the elongated piece 8 of the seat rail 4. The upstanding portion 7B includes a transverse through-hole 32 which is disposed coaligned with the transverse through-hole 34 of the seat rail 4 when the seat holder 7 is positioned on the seat rail 4

The seat adjustment latch 1 includes a tube or tubular bolt 9, a sliding piece 10, a return spring 17, a cable conduit 24, a control cable 12, a return spring 11 and a pressure plate 13. In operation, the tube 9 is received within coaligned transverse through-holes 32 and 34 of the seat holder 7 and seat rail 4, respectively, and is supported by a first sleeve or collar 28 at the inward facing surface of seat holder 7 and a second end collar 30 disposed at its outermost terminal tube end. The end collar 30 is attached to the piece 8 and is open at its inward facing end to slidably receive the tube 9. The sleeve 28 is mounted to the piece 7 and is axial aligned with collar 30 and the holes 32, 34. The transversely oriented tube restrains the fore/aft sliding movement of the vehicle seat in the longitudinal direction of the vehicle. The adjustable positioning of the seat in the longitudinal direction is accomplished in the usual manner (i.e., by removing the tube 9 from the holes 32 and 34 by means of a conventional hand lever or a known electrical actuation device (see FIG. 2)).

The sliding piece 10 is disposed within the tubular bolt 9 and is biased by the return spring 17 for selective sliding reinforcement of the tubular bolt. The spring 17, in turn, is connected to the control cable 12 which is sheathed within the conduit 24. The other end of the control cable 12 is linked to a pressure plate 13 which is biased by the return spring 11. The spring force of the return spring 11 is preferably greater than that of the return spring 17. The seat adjustment latch 1 is mechanically coupled to a lock tongue 14 of the belt lock 2 via the cable 12.

The latch 1 as shown in FIG. 1 is set to operate at a first force level setting corresponding to the condition where the seat belt is fastened. In this setting, the lock tongue 14 depresses the plate 13 thereby overcoming the resistance force of spring 11 and, acting via the cable 12, pushes the piece 10 to its reinforcement position (i.e., into the area of abutment between piece 8 and the seat holder 7). When the piece 10 is so positioned, the seat is unlikely to move in the longitudinal direction (i.e., "breakaway") during a severe frontal impact to the vehicle.

When the seat belt is not fastened, the latch 1 is moved to a second force level setting and is placed in its "active" position. That is, the tongue 14 is moved upwardly in the direction of an arrow 15 and is disengaged from the pressure plate 13. The resulting displacement causes spring 11 to move the plate 13 upward and pull the sliding piece 10, via the cable 12 and spring 17, such that it moves to the left in the direction as shown by arrow 16. In the unfastened condition of the seat belt, the sliding piece 10 is moved out of its tubular bolt reinforcement position (i.e., away from the region of abutment between piece 8 and the seat holder 7) under the influence of the force of the spring 11. The wall thickness 26 of tube 9 is chosen such that the tube 9 acts as a breaking or shearing element. When the seat belt is not being worn, and a certain force exceeding a predetermined threshold impacts the vehicle during a frontal collision, the tube shears thereby releasing the seat. The seat of the vehicle is moved forward at approximately the same time and rate as the occupant sitting thereon, and a small person is prevented from sliding off or submarining from the seat before reaching the inflated air bag and/or knee restraint.

With reference to FIG. 2, an alternate embodiment for the seat adjustment latch which utilizes an electric seat adjustment is shown. In FIG. 2, all elements common to the FIG. 1 embodiment are denoted by a prime "'" indicator following the common reference numeral. In this embodiment, the setting of the seat adjustment latch at either the first or the second force level is accomplished electrically through a solenoid-actuated locking magnet 21. Sliding piece 10' is preferably made from a ferromagnetic material. When the seat belt is unfastened, the solenoid 23 is energized, thus magnetically attracting sliding piece 10' towards the magnet core 25 (i.e., in the direction of arrow 16') and compressing spring 17'. When the seat belt is fastened, current to solenoid 23 is cut off. This permits the compressed spring 17' to expand and urge sliding piece 10' back into position to reinforce the tubular bolt 9'. The actual use condition or state of the seat belt (i.e., whether the seat belt is fastened or not) is fed back to the seat adjustment latch via an actuating signal generated by a contact switch 27 associated with the seat belt closure mechanism (not shown).

In another alternate embodiment the seat adjustment latch is activated only when the seat is placed in the farthest back or rearwardmost position. Since the particular problem of an average-sized or larger occupant sliding off the seat before contacting a knee restraint is greatest when the seat is placed in the rearwardmost position, it is sufficient to provide for seat release under heavy loads only when the seat is so positioned. If the seat is placed in a more forward position the seat release is preferably disabled. Alternatively, any sliding movement of the seat may be limited by using a suitably cushioned stop. Thus the occupant sitting on the seat is not subjected to unnecessary forces arising as a result of an unnecessary release and acceleration of the seat.

As is best seen in FIG. 3, the seat 6, when released to move forward, may if necessary be braked and/or limited in its motion by an additional braking device or cushioned stop 38. A corresponding rearward movement of the seat in the event of a rear collision can also be braked and its motion left free or restrained. Also, as is seen in FIG. 3, the cable control conduit 24 of the latch assembly 1 is preferably contained within the lower belt portion 39 of the lap belt assembly 40.

It will be appreciated that, in lieu of the breaking element, other designs or techniques may be used. For example, a catching device may be used to hold the seat holder to the seat rail. Under certain conditions the device is overloaded and releases the seat.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. An improved passive safety system in a motor vehicle which includes an inflatable air bag, a knee restraint, at least one seat having a seat support for slide adjustable fore/aft movement of the seat and seat support along floor mounted seat rails in a longitudinal direction of the vehicle, a seat adjustment latch for selectively retaining the seat and seat support to the seat rails at a plurality of seat adjustment positions, and a seat belt, said improved passive safety system comprising in operative combination:
   a) means for detecting the fastened and unfastened condition of the seat belt;
   b) means responsive to said seat belt condition detecting means for selective reinforcement of the seat adjustment latch so that:
      i) when the seat belt is fastened, the seat adjustment latch is set at a first reinforced position to resist breakaway movement of the seat and seat support along the seat rails; and
      ii) when the seat belt is unfastened, the seat adjustment latch is set at a second unreinforced position to permit breakaway movement of the seat and seat support along the seat rails to carry a seated passenger forward for effective engagement with the knee restraint and air bag in the event of a sudden deceleration impact to the vehicle above a predetermined level of severity.

2. An improved passive safety system as in claim 1 wherein said selective reinforcement means of said seat adjustment latch is a shearing element which includes:
   a) a tubular bolt received within a pair of coaligned, transverse through-holes provided in longitudinally oriented abutting side wall portions of the seat support and the seat rail;
   b) said tubular bolt having a hollow interior and a wall thickness of a dimension predisposed to shear at a region adjacent said abutting side wall portions when acted upon by a shear force which results from the combined inertia of the seat and seated passenger in the event of said rapid deceleration; and
   c) a sliding reinforcement piece disposed within said hollow interior of said tubular bolt for movement into and out of said shear region for selective cross-sectional reinforcement of said tubular bolt.

3. An improved passive safety system as in claim 2 wherein the seat adjustment latch is mechanically adjusted and wherein said seat belt condition detecting means includes:
   a) a cable having a first end including a lock tongue for selective engagement with a belt lock of said seat belt and a second end connected to said sliding reinforcement piece.

4. An improved passive safety system as in claim 3 which includes braking means for selectively limiting the fore/aft range of travel of the seat upon release in response to a sudden deceleration above said predetermined level of severity.

5. An improved passive safety system as in claim 2 which includes braking means for selectively limiting the fore/aft range of travel of the seat upon release in response to a sudden deceleration above said predetermined level of severity.

6. An improved passive safety system as in claim 2 wherein the seat adjustment latch is electrically adjusted and wherein:
   a) said seat belt condition detecting means includes a contact switch;
   b) said reinforcement piece is formed of a ferromagnetic material; and
   c) said seat belt condition detecting means includes a solenoid-actuated locking magnet and biasing spring for selectively moving said reinforcement piece into and out of said shear region of said tubular bolt in response to a signal from said contact switch corresponding to the fastened and unfastened condition of said seat belt.

7. An improved passive safety system as in claim 6 which includes braking means for selectively limiting the fore/aft range of travel of the seat upon release in response to a sudden deceleration above said predetermined level of severity.

8. An improved passive safety system as in claim 1 which includes braking means for selectively limiting the fore/aft range of travel of the seat upon release in response to a sudden deceleration above said predetermined level of severity.

* * * * *